United States Patent [19]
Leone et al.

[11] Patent Number: 5,745,360
[45] Date of Patent: Apr. 28, 1998

[54] DYNAMIC HYPERTEXT LINK CONVERTER SYSTEM AND PROCESS

[75] Inventors: Paul Thomas Leone, Raleigh; Mark Williams Lumsden, Apex; Victor Edward Pulizzi, Holly Springs, all of N.C.

[73] Assignee: International Business Machines Corp., Armonk, N.Y.

[21] Appl. No.: 514,935

[22] Filed: Aug. 14, 1995

[51] Int. Cl.$^6$ ............................................. G05B 11/01
[52] U.S. Cl. .................. 364/140; 395/600; 395/700; 395/720; 395/325; 395/54; 395/148; 395/200.01; 395/200.18
[58] Field of Search .................. 364/140; 395/600, 395/700, 325, 54, 148, 200.01, 200.18, 720

[56] References Cited

U.S. PATENT DOCUMENTS

| | | | |
|---|---|---|---|
| 5,105,184 | 4/1992 | Pirani et al. | 340/721 |
| 5,167,011 | 11/1992 | Priest | 395/54 |
| 5,195,184 | 3/1993 | Peterson et al. | 395/325 |
| 5,283,894 | 2/1994 | Deran | 395/600 |
| 5,291,602 | 3/1994 | Baker et al. | 395/700 |
| 5,299,304 | 3/1994 | Williams et al. | 395/148 |
| 5,355,472 | 10/1994 | Lewis | 395/600 |
| 5,388,215 | 2/1995 | Baker et al. | 395/200.01 |
| 5,406,473 | 4/1995 | Toshikura et al. | 364/140 |
| 5,450,545 | 9/1995 | Martin et al. | 395/700 |
| 5,479,411 | 12/1995 | Klein | 370/110.1 |
| 5,513,323 | 4/1996 | Williams et al. | 395/200.18 |
| 5,520,852 | 5/1996 | Meske, Jr. et al. | 395/600 |
| 5,522,079 | 5/1996 | Acker et al. | 395/700 |
| 5,530,852 | 6/1996 | Meske, Jr. et al. | 395/600 |
| 5,557,773 | 9/1996 | Wang et al. | 395/500 |
| 5,584,024 | 12/1996 | Shwarts | 395/604 |

OTHER PUBLICATIONS

Miller Freeman, Hypertext browsing on the Internet, Journal UNIX Review, v12, n9, p. 21, Sep. 1994.

James Powell, Creating a Hypertext Library Information System, World Wide Web, pp. 59–66, Feb. 1994.

Marcus et al., User–Interface Developments for the Nineties, IEEE, pp. 49–57, Sep. 1991.

Armbrster et al., Broaddand Multimedia Applications Using ATM Networks: High–Performance Computing, High–Capacity Storabe, and High–Speed Communication, IEEE, pp. 1382–1396, Dec. 9, 1992.

Mendelson, Edward, "Publish to the Web No Experience Required", PC Magazine, v14, n17, p. 203 (5), Oct. 10, 1995.

Powell, James, Adventures with the World Wide Web: Creating a Hypertext library information system,ABI/INFORM 14367.00 Artcle Ref. No.:, v17n1 pp. 59–66, ISSN: 0162–4105 JRNL CODE: DTB, Feb. 1994.

*Primary Examiner*—Reba I. Elmore
*Assistant Examiner*—McDieune L. Marc
*Attorney, Agent, or Firm*—Edward H. Duffield

[57] ABSTRACT

The methodology used converts non-HTML softcopy documents to HTML formatted documents based on examination of hypertext link entry points. To resolve these links, the invention interrogates the non-HTML formatted texts for hypertext links, verifies that the links are still valid (determines whether the to-be-linked-to topic, document or reference still exists) and constructs HTML link anchors. After all non-HTML links are resolved (i.e., converted to HTML, verified, and HTML anchors constructed), the entire topic or accessed portion of a requested document or topic text is formatted into HTML text and hypertext links. The most common entry point for beginning he conversion process is the table of contents. This usually provides numerous hypertext entry points to other topics contained in the work. Links can exists at any spot in the work. They are not limited to topic links only.

8 Claims, 12 Drawing Sheets

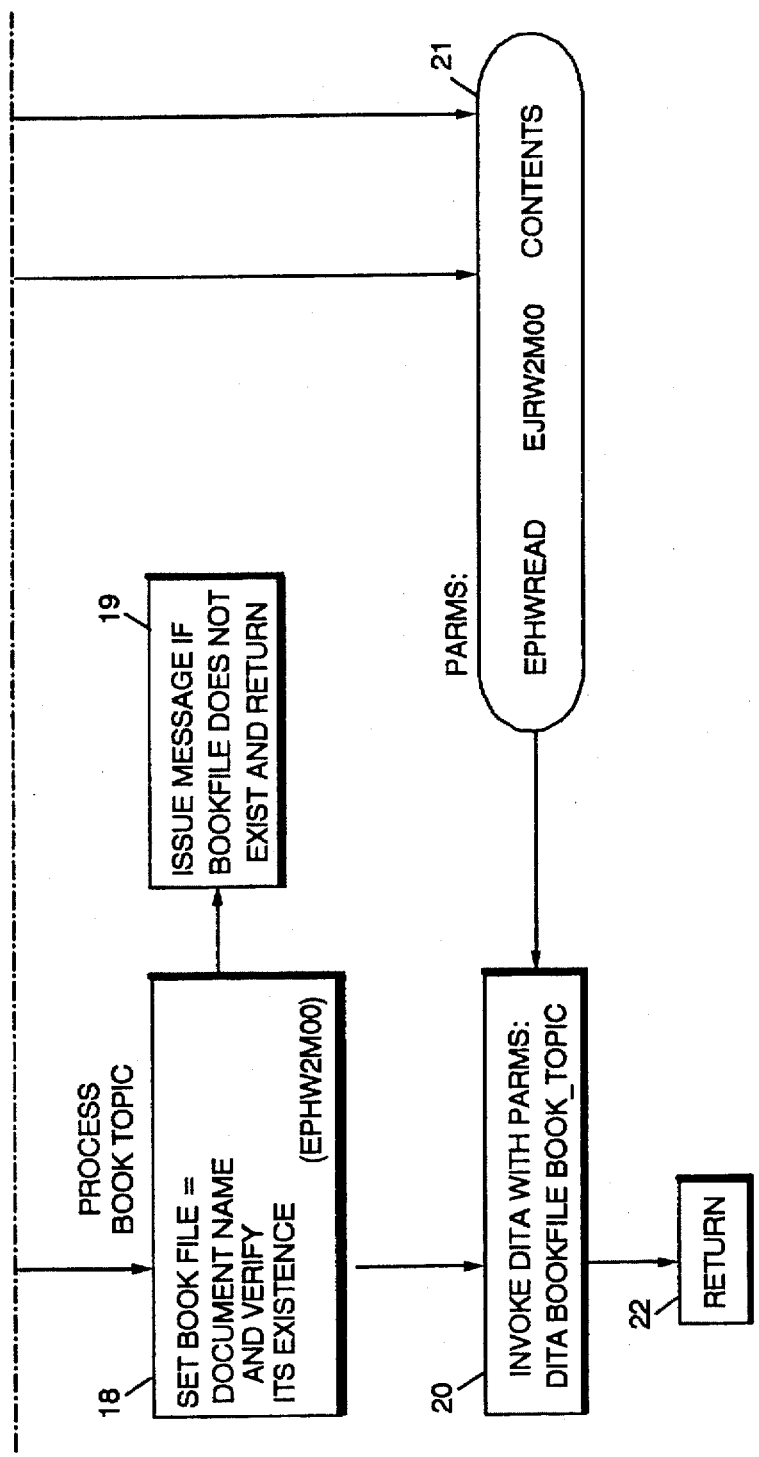

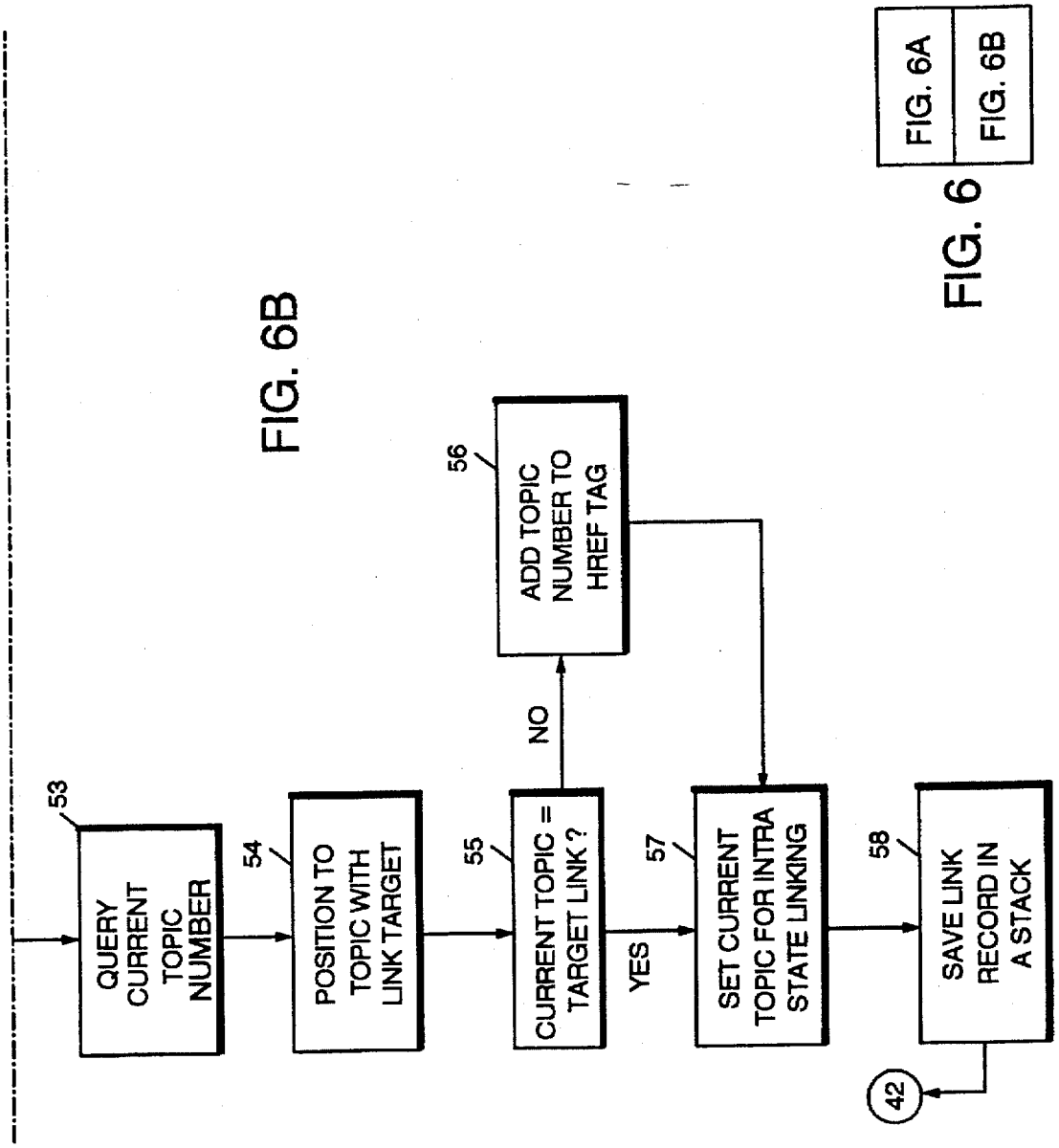

DYNAMIC HYPERTEXT LINK CONVERTER SYSTEM AND PROCESS

BACKGROUND OF THE INVENTION

The World Wide Web (WWW) is an open communications network where computer users can access available data, digitally encoded documents, books, pictures, sounds, etc. WWW has published specifications for how documents to be made available are to be encoded, called "protocols". The specification for the protocols are, themselves, kept available in digital form on the WWW. They may be found at "HyperText Markup Language-2.0", T. Berners-Lee, D. Connolly, Jun. 16, 1995, available at: <http://www/w3.org>, available on: </hypertext/WWW/MarkUp/html-spec/html-spec_toc.html>. These protocols specify that the HyperText Markup Language (HTML) must be used to prepare documents in order to enable a WWW user to display the document information at the user's computer using access programs and display devices (called "browsers"). Documents are traversed in segments related to one another using hypertext links otherwise known as "links".

Hypertext links allow a reader to view available digitally encoded document information in a non-sequential manner. Using hypertext links one can jump from one location in a document or book to another, to another document, or to another book entirely. This capability is inherent in the documents presented on the WWW and in many other electronic document systems, such as the IBM Corporation's electronic document creation, access and display product called "BookManager" (TM). The WWW system, however, cannot use the BookManager format of documents, which contain BookManager hypertext links, because the original format of BookManager books and documents, like all other pre-WWW systems, does not use the HyperText Markup Language (HTML) format required for WWW. The Internet WWW browsers can only operate on text and links in HTML format. This prevents users from posting and accessing a multitude of pre-existing BookManager, or other, non-HTML formatted documents on WWW, and thus precludes potential sharing of literally millions of older documents, books and other digital resources.

A methodology was needed to dynamically convert documents constructed using BookManagers+ internal "hypertext" softcopy document linking format, or generally any non-HTML formatted documents, into HTML formatted text and link Anchor Tags, (links) while retaining the original document's format for portability to other computer operating system platforms.

OBJECT OF THE INVENTION

In view of the above identified shortcomings in the prior art, it is an object of this invention to provide an improved method and means for automatically converting non-HTML text and hypertext links to HTML texts and HTML links in electronically formatted documents for access over communications networks.

It is further an object of this invention to provide automatic validation of hypertext links to be taken prior to converting the non-HTML links to HTML links.

BRIEF SUMMARY OF THE INVENTION

Non-Hypertext Markup Language (HTML) documents are converted to HTML formatted hypertext link constructions for access on the World Wide Web (WWW) using a process that identifies, validates and then converts non-HTML hypertext links and text to validated, HTML-formatted links and text.

The methodology used converts non-HTML softcopy documents to HTML formatted documents based on examination of hypertext link entry points. To resolve these links, the invention interrogates the non-HTML formatted texts for hypertext links, verifies that the links are still valid (determines whether the to-be-linked-to topic, document or reference still exists) and constructs HTML link anchors. After all non-HTML links are resolved (i.e., converted to HTML, verified, and HTML anchors constructed), the entire topic or accessed portion of a requested document or topic text is formatted into HTML text and hypertext links. The most common entry point for beginning he conversion process is the table of contents. This usually provides numerous hypertext entry points to other topics contained in the work. Links can exists at any spot in the work. They are not limited to topic links only.

BRIEF DESCRIPTION OF THE DRAWINGS

The invention as embodied in a preferred embodiment thereof will be described in detail herein, in conjunction with which, the preferred embodiment is illustrated in the drawing in which:

FIG. 3 which is composed of FIGS. 3A and 3B illustrates schematically how FIGS. 3A and 3B are combined. FIGS. 3A and 3B illustrate the process by which the gateway logic in FIG. 2 interprets a user's request to access an identified document. This logic constructs an appropriate inquiry to the preferred embodiment of the invention to generate a topic segment of non-HTML source records, identified by the request, to HTML records and HTML link anchor tags in WWW-compatible format.

FIG. 6 which is composed of FIGS. 6A and 6B illustrates schematically how FIGS. 6A and 6B are combined. FIGS. 6A and 6B illustrate the operation of the preferred embodiment in validating the existence of to-be-linked-to documents while constructing HTML anchor tags from non-HTML hypertext links found in the document to which access is requested, FIG. 7A composed of FIGS. 7A-1 and 7A-2 illustrates schematically how FIGS. 7A-1 and 7-2 are combined. FIGS. 7A-1 and 7A-2 illustrate the preffered embodiment of the invention in operation to process non-HTML links and convert them to HTML formatted hypertext links.

DETAILED DESCRIPTION OF THE PREFERRED EMBODIMENT

Figure 1:
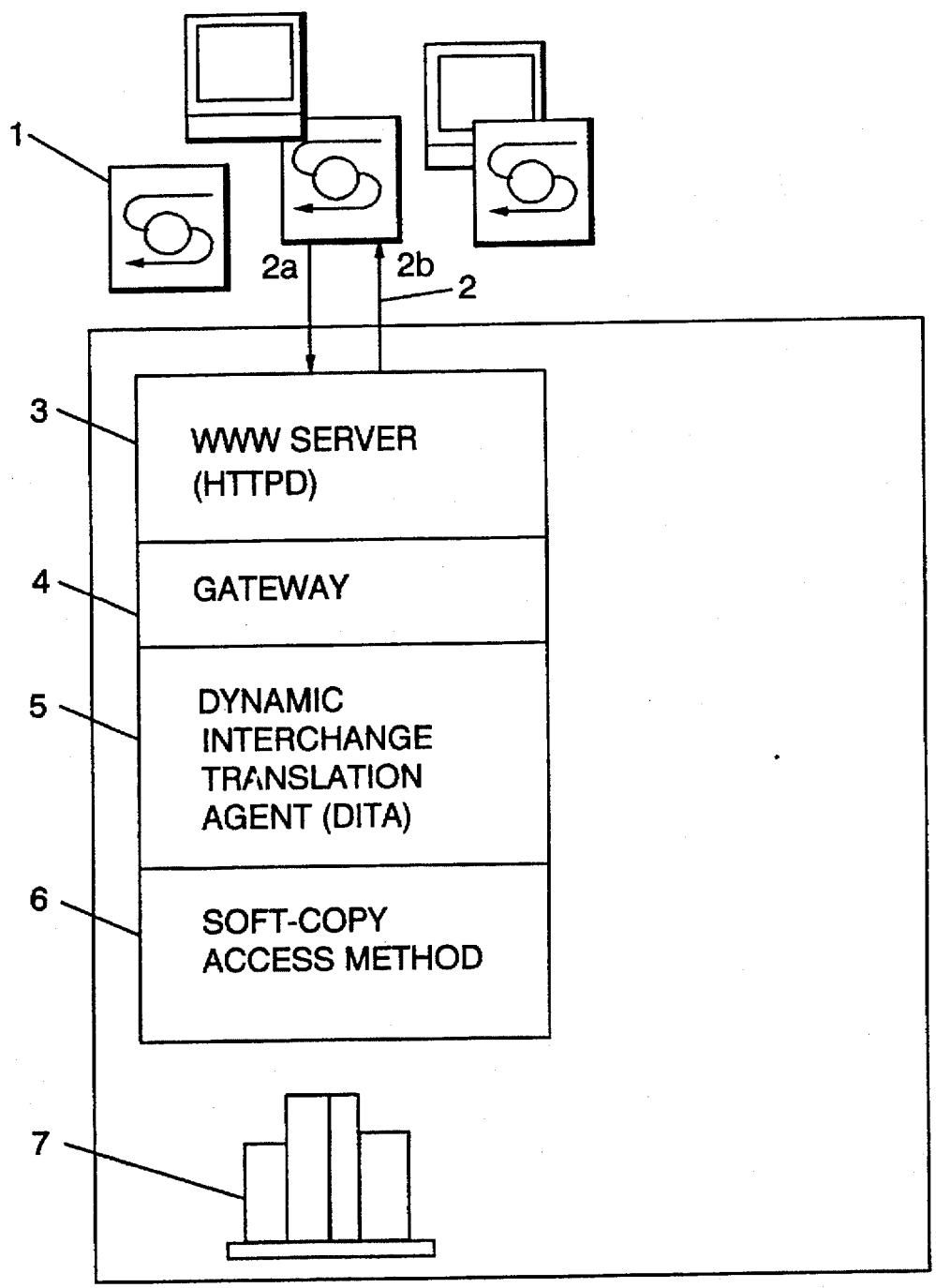
FIG. 1 schematically illustrates the overall operating environment of the invention in which users communicate over the World wide web (WWW) to access electronically stored documents or books which exist in non-HTML format requested by a user having a "browser" (a computer with a communications port, a reader program and display) at their terminal. Typical browsers, such as Mosaic, IBM Web Explorer, etc., access WWW documents via a request to a server connecting a system to the WWW.

The content of a non-HTML document or book file is typically chained together using hypertext links. When a WWW hypertext link is selected by a reader from a topic, the invention conversion process, called the Dynamic interchange Translation Agent (DITA), is invoked. The invocation is based on parameters extrapolated from the Common Gateway interface (CGI) script logic function, an interface program process. The preferred embodiment will be described as implemented to address hypertext link and text conversion from non-HTML sources, such as IBM's BookManager (TM) files, to make them useable over the WWW, but any non-HTML sources could be treated similarly.

A Universal Resource Locator (URL), well-known to user's of WWW, is inserted in the text using control records from the book. The URL is the standard WWW format used as the reference ID to locate the desired HTML or non-HTML objects. When a book object is opened from a WWW browser a typical URL used to locate the book would look like the following:
<http://booksrv2.Raleigh.ibm.com/cgi-bin/bookmgr/bookmgr.cmd/BOOK S/ejrw2m00/CONTENTS>

In this case the CGI script logic, BOOKMGR.CMD, is invoked. This script (a computer program) receives the remaining parameters from the URL. The CGI script will parse the parameters and construct an executable instruction (See FIG. 3) to be executed by the special agent program of the invention.

In this example, CGI would launch: EPHWREAD EJRW2M00 CONTENTS, where "EPHWREAD" is the special agent program of the invention that will open the user-identified book EJRW2M00, position to a topic called CONTENTS, identify, validate and resolve all hypertext links found therein, and begin translation of the (non-HTML) BookManager hypertext links found in Book Interchange format (BIF) to HTML formatted hypertext links.

As part of the translation process, the hypertext links in the book are located and built into constructs representing HTML hypertext link anchors. This process resolves inter and intradocument non-HTML explicit links and thus preserves the book author's intentions of what is to be linked, and where. Since the book links are resolved dynamically at the time browsing is requested, the HTML formatted text and links generated are always current. That is, if the author changes the book, the existing links will be resolved and the author's intention preserved even if topics are added or removed. With pure HTML this is not possible without revising and re-generating the entire book for browsing.

Example Invocation Of The Dynamic Interchange Translation Agent (Dita)

The following scenario details the flow of the process followed by the invention when a user invokes access to a non-HTML formatted document, such as one created by the IBM BookManager (TM), and accessed by the IBM BookServer, from his workstation computer having a World Wide web (www) Browser. The user requests to read a book which has, unknown to the user, been formatted in non-HTML hypertext linking format by a non-HTML electronic document creation and access tool, such as IBM's BookManager (TM).

Beginning with FIG. 1, a user starts their WWW Browser 1 and specifies, using a Remote Procedure Call, arrow 2a, the URL of the BookServer home page <http://booksrv2.ibm.com> to begin selection of a document or book to read.

The HTTPD server 3 having been invoked by the browser 1 via a Remote Procedure call (RPC), using TCP/IP sockets. The HTTPD server 3 returns the appropriate HTML 2b, to the BookServer home page. This description assumes that the BookServer home page on WWW is already formatted in HTML.

The BookServer home page is displayed on the reader's browser 1.

The reader selects, for example, the BookServer Library page 1, </cgi-bin/bookmgr/bookmgr.cmd/library>, which is routed by the HTTPD server (box-3) to the BookServer CGI program, 4, for processing.

The CGI program 4 returns the Library Page HTML, arrow 2b, to the HTTPD server 3 and the Library Page is displayed on the reader's WWW Browser, 1.

The reader selects a book to read from the Library Page <books/ephw2m00/contents>, and the selection identification is routed by the HTTPD server 3 to the BookServer CGI program 4 for processing.

The CGI program 4 examines the URL and invokes the special agent program component, which is the preferred embodiment of the invention, 5 with the appropriate parameters to open the book and position, the reader and display to the table-of-contents-topic. (See description of FIG. 3 for details of how the CGI component parses the URL, builds the parameters and invokes the special agent component.)

The special agent component 5 invokes the soft copy access method tool 6 to open and read the requested book 7 and positions the access tool 6 to the user-requested topic. The special agent process 5 then converts the requested topic into the appropriate HTML format and sends it back to the HTTPD server to be displayed on the readers browser.

Figure 2:
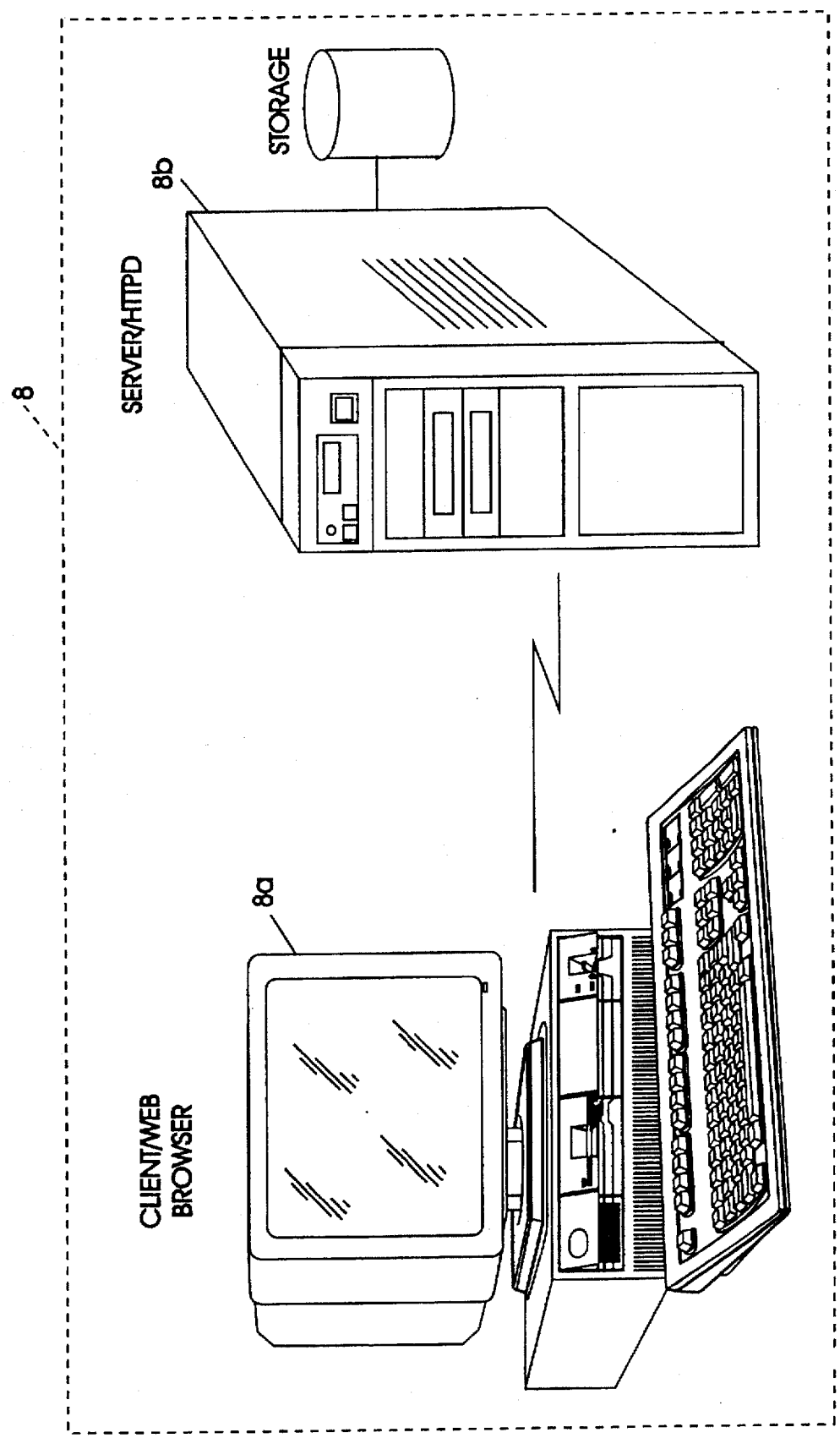
FIG. 2 illustrates a user's web browser acting as a client and requesting access to documents via a server (a computer running an access program to the Www, such as HTTPD).

The WWW operating environment is of the client/server type, as depicted in FIG. 2. In general terms, the WWW browser workstation 8a is used by a reader on the client side which communicates with an server HTTPD workstation 8b on the server side. The communications is performed via a Remote Procedure Call using standard TCP/IP sockets between the HTTPD server and the Browser.

Figure 8:
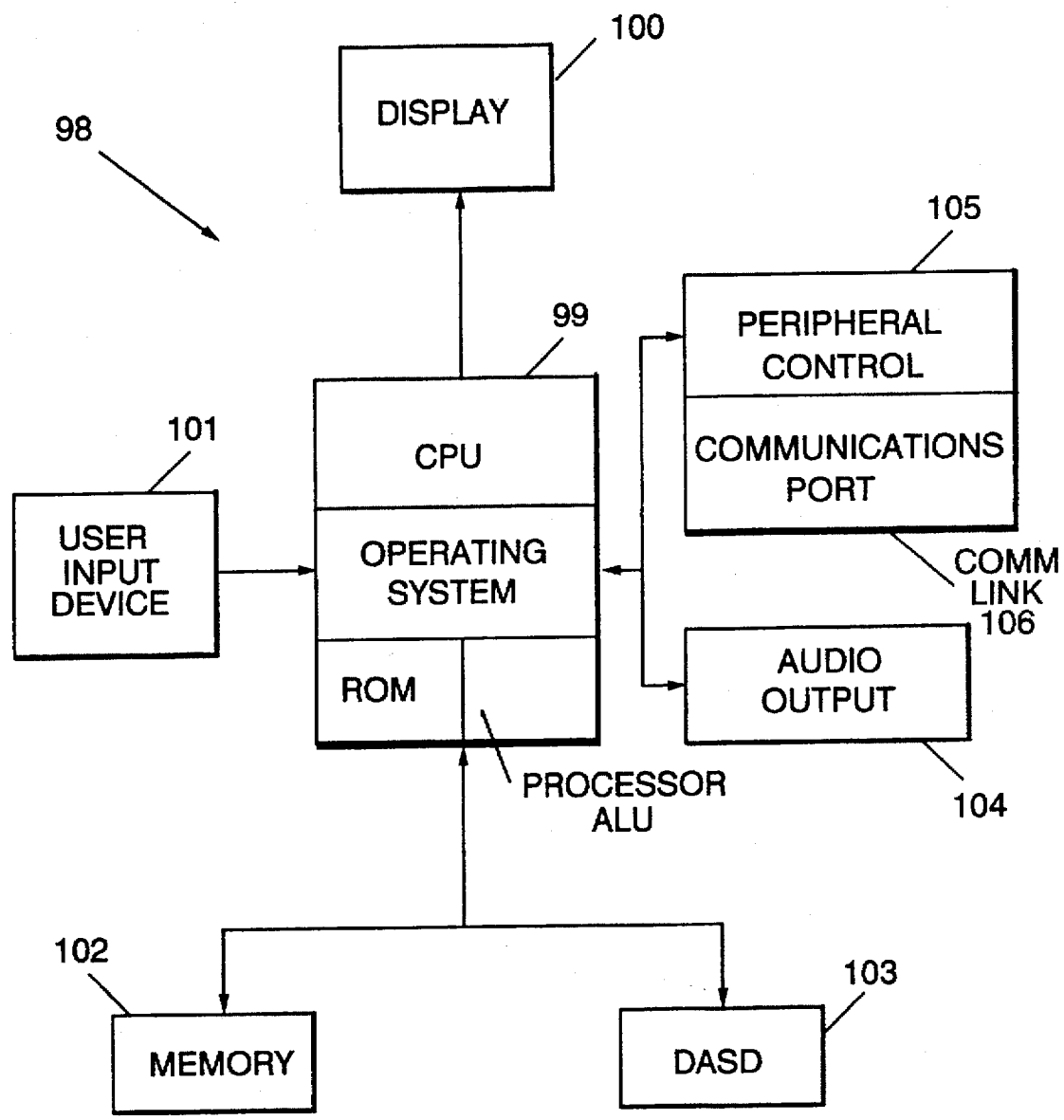
FIG. 8 illustrates schematically a typical user's workstation or computer system capable of being connected to the WWW either accessing WWW or for acting as a server to other users connected to the WWW and running a server program for accessing, converting and outputting HTML formatted topics to such users or requestors.

A typical computer system 98 is shown in FIG. 8. The system may form a typical node in a communication network which may be a local area network (LAN), or a distributed multi-node communication network of either national or international span.

In FIG. 8, the computer system 98 may include the typical central processing unit (CPU) 99 that typically incorporates an operating system, read only memory (ROM) for the processor's resident control code, and a processor arithmetic and logic unit (ALU) as shown within Box 99. A display, which may be a CRT, a printer, or any other means for communicating to an operator, is shown as 100 linked to the CPU 99. User input devices, such as mice, a keyboard, a joystick, audio input, and the like, are indicated generally in Box 101, connected to the CPU 99. Two-way communication between the CPU 99 and a direct access storage device, such as a disk drive 103 or bulk memory 102, is also shown. An audio output 104 may be included, as in a multimedia terminal or personal computer, and a peripheral control IO 105 with a communications port connected to communication link 106, by which the computer system 98 may be linked over a communications network or local area network to numerous other computer systems, is also shown.

Figure 3A:
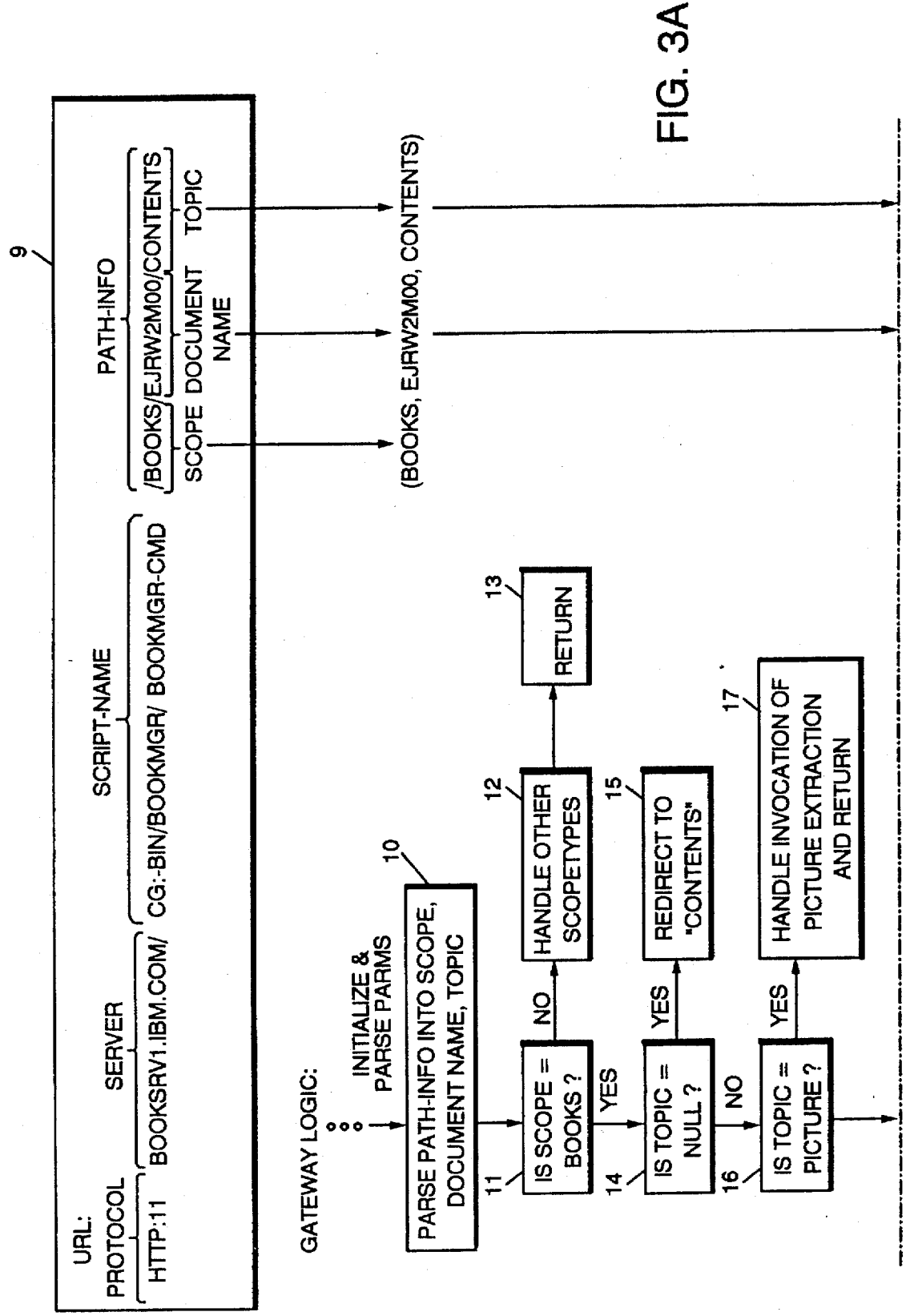

FIG. 3 details how the CGI logic component parses the URL, builds the parameters and invokes the special agent component 5.

The incoming URL 9 is received in WWW environment variables and format, examined, and parsed into its constituent variables.

The path_info variable is found in box-10 and is further parsed into scope, documentName and topic variables.

The scope variable is examined in box-11 to determine if it specifies a book. If it does not specify a book, other types of scopes that are present are processed in box-12 and the CGI program returns in box-13.

If the scope variable specifies a book, then the topic is examined in box-14 to see if the topic itself is unspecified (null). If the topic is unspecified, the process is redirected to the topic name of "contents", representing the Table of Contents topic in box-15. A redirection causes a new URL in box-9 to be created and passed in again for processing and eventual presentation to the read (user's) browser.

If the topic was specified (not null), it is checked to see if it specifies a picture in box-16. If it does specify a picture, then the CGI logic handles the process for extracting the picture and returns via box-17.

when the topic does not specify a picture, then CGI is ready to process a topic in the book, box-18. The bookfile is set to the documentName and checked (verified) to be sure the file exists. If the file does not exist, a message to that effect is issued at box-19 and the CGI returns.

If it was determined that the bookfile exists, a parameter list is built in box-21 containing specifications for the bookfile to be opened and the topic to read (EJRW2M00 CONTENTS) and the special agent process 5 is invoked in box-20 with the parameter list.

The CGI returns in box-22 after invoking the special agent process.

Dynamic Interchange Translation Agent (Dita) Process And Data Flow

The preferred embodiment of the invention is illustrated with regard to a special agent process that converts IBM's non-HTML formatted books created by the IBM BookManager Build process into HTML formatted ones. The special agent process will be called "DITA" herein. DITA is the core component process that produces the HTML formatted topics (both text and link anchors) generated by hypertext links. This provides real-time conversion of the non-HTML format to HTML. A hypertext link is the entry point into a discrete portion of a book. Performance considerations led to a design of serving only small discrete chunks, or portions of books, known as "topics", to Web browsers instead of processing the entire book at one time. The process below describes in detail the format and mechanisms used to reconstruct from non-HTML books the validated HTML links used by the web protocols. The DITA process must analyze the hypertext link query, access the selected chunk in the database (softcopy book) and resolve all subsequent links contained in this chunk with HTML formatted links. HTML Elements used by DitA to construct a link Hypertext links are comprised of both a link definition and a link destination. The link definition defines the location in the text from which the link can be taken. It also specifies the location where the link is to be made (the destination address) when the link is taken. The link destination is the location, usually in another part of a book or document, that one goes to when following a hypertext link. A specific spot in a book topic is designated by a location identifier after the destination address. HTML anchor tags are used to specify both forms or ends of the hypertext links (definitions and destinations).

An anchor, specified by an HTML anchor tag, is used to identify the hypertext link definition and the destination of a hypertext link, depending on the attributes specified on the anchor tag. Three usages, A1, A2, and B, of the HTML anchor tag are shown below.

They are grouped as follows:
   A) Specifying a hypertext link definition
      (A1) Defining a link definition
      (A2) Defining a link definition with a destination identifier
   (B) Specifying a destination identifier of a hypertext link
   A detailed explanation of the structure and function of these types of HTML anchor tags follows.
   (A1) The general form of an anchor tag that specifies a hypertext link definition follows:
      <a HREF="url"> hot text </a>
   Where:
      <a designates the start of the anchor tag,
      HREF=is the attribute used to identify this tag as specifying the link definition,
      "url" is the specification of where to link (the destination of the hypertext link), enclosed within double quotes,
      > identifies where the beginning of the selectable text occurs (hot text). Hot text is the text between the anchor tags that is made selectable (hot) so the reader can click on it to be taken to the link destination; and
      </a> designates the end of the anchor tag.
   (A2) Alternate form of an anchor tag specifying a hypertext link definition identifier:
      <a HREF="url#identifier"> hot text </a>
   Where:
      <a designates the start of the anchor tag,
      HREF =is the attribute used to identify this tag as specifying the link definition,
      "url is the specification of where to link (the destination of the hypertext link),
      #identifier" specifies a unique identifier within a document (e.g. a specific spot) to scroll to at the link's destination, prefixed by a pound-sign (#),
      > identifies where the beginning of the selectable text occurs (hot text). Hot text is the text between the anchor tags that is made selectable (hot) so the reader can click on it to be taken to the link destination; and
      </a> designates the end of the anchor tag.
   (B) The general form of an anchor tag specifying the destination identifier of a hypertext link follows:
      <a NAME="identifier"> associated text </a>
   Where:
      <a designates the start of the anchor tag,
      NAME=is the attribute used to identify this tag as the destination of a hypertext link "identifier". The destination of a link is specified by a unique identifier, enclosed within double quotes, > identifies where the beginning of the associated text occurs. Associated text is the text between the anchor tags that is associated to the destination of the link. This is the spot the reader will be taken to in the document when the link is chosen; and </a> designates the end of the anchor tag.

Examples of HTML anchor tag attributes and their usage follows:

(A1) HREF=". . ."

Specifying a link definition with the HTML anchor tag:

<a HREF="2.0"> This text is hot </a>, designates 2.0 as the link destination address. The highlighted text in this example is: "This text is hot."

If the reader selects the text "This text is hot", the reader should be presented with another topic, 2.0 in this example, whose network address is defined by the value of the HREF attribute. Anchors to other topics in the same non-HTML book can specify the relative URL, which is the topic-id. In the above example, 2.0 is a relative URL indicating topic 2.0.

(A2) HREF=". . . #identifier"

To refer to a specific location at the link destination, the HTML anchor tag:

<a HREF="2.0#TBLTABLE1"> This text is hot </a>, would present the user with topic 2.0 and then position the user to the identifier TBLTABLE1, within topic 2.0. The identifiers must be unique within an HTML document. identifiers in non-HTML books are unique throughout the entire book.

(B) NAME="identifier"

To identify a specific location in an HTML document to position to, the HTML anchor tag:

<a NAME="TBLTABLE1"> Table-1: Cost vs. Performance </a>, is placed at the specified location in the destination document. In topic 2.0, the identifier TBLTABLE1 is specified by its associated text "Table-1: Cost vs Performance", so the HTML document can be positioned to this spot when the link in the previous example is taken.

Book Interchange file format used by DITA to construct a link

There are three types of non-HTML IBM BookManager (TM) records used by the preferred embodiment of the conversion process (special agent DITA) in processing hypertext link records. These records are generated by the IBM BookManager Build (TM) product when the book is created. These are TEXT, SEARCH and CONTROL records, respectively.

TEXT Text records contain the plain text of the book. They are used to display the text by BookManager READ, an electronic text display tool performing the reading and display function of BookManager.

Text records have a blank "" segment in their record type field (column one).

SEARCH Search records contain text that is not part of the plain text of the book (e.g. headings, index entries, etc.). They are used to create search index text.

Search records have an "S" in their record type field (column one).

CONTROL Control records contain data that is used by BookManager to format and display the book.

Control records have a "C" in their record type field (column one).

The control record used for hypertext linking is:

SELECT—Specifies the start of a hypertext link to other locations within a non-HTML book, or to locations outside a non-HTML book depending on the form of the record. The SELECT control record is referred to as the CSELECT record.

The CSELECT record has three forms for hypertext linking. The forms of the CSELECT record include:

reference-id—A unique reference identifier used to find different elements in a non-HTML book LNK—Specifies the start of a hypertext link (to locations outside of a non-HTML book)

OUT—Specifies the start of a hypertext link (for inlined images external to a non-HTML book)

Non-HTML Records For Link Definitions

The reference-id form of the CSELECT record

The CSELECT record makes the specified text of the link definition selectable on the screen. The starting column and length of the text to be selectable are specified by the author when defining the link and are recorded in the CSELECT record format by the BookManager BUILD process.

The select record can occur numerous times in a topic. Each CSELECT record refers to the first text record that follows it. To link to other objects contained in the book, the CSELECT record has the following form:

CSELECT startcolumn length type&reference ID

Example:

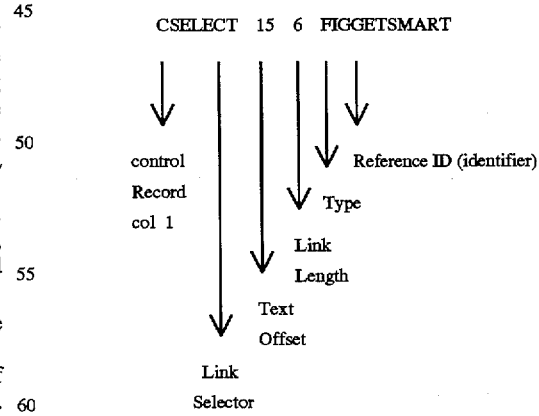

Following is the format of a text record which begins at column 4; column 1 being for a text record ID, and 2–3 being for attributes. In this example, these first three columns are left blank.

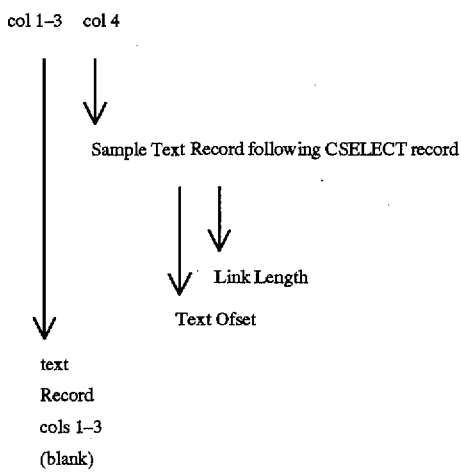

The LNK and OUT form of the CSELECT record
The general form of the LNK and OUT records follow:
LNK <objtype> <object> <data> <document address> <>< docdesc id> OUT <objtype> <object> <data>
Where:
<objtype> is the type of link to perform.
Valid Internet types for this variable are OTHER or IMAGE.
<object> When the variable contained is INTERNET, designates a link to an Internet resource of the specified objtype
<data> specifies the URL address of an Internet image. Valid only when objtype=IMAGE.
<document address> specifies the URL address to link to (the destination of the hypertext link)
<> not used
<docdesc id> the link reference identifier
Sample LNK And OUT forms of the CSELECT record with accompanying TEXT record The LNK record is a link definition record for a hypertext link to another URL outside a non-HTML book. The URL could be another non-HTML Book, or any internet object address.

Three examples follow:
1. Linking to an Internet object
2. Inlining an Internet image
3. Inlining an Internet image and linking to an internet object Example 1:
CSELECT 49 15 LNK <OTHER> <INTERNET> <> <http://www.ibm.com/> <> <LNK001>
Sample Text for LNK record to link to another internet object.

Example 2:
CSELECT 3 54 OUT <IMAGE> <INTERNET> </bookmgr/library.gif> Sample Text for OUT record to inline an internet image.

The OUT record is a link definition record for a hypertext link to find an image from the internet and display inline (that is, in the proper place on a displayed page of text and images) that image in the non-HTML Book, ahead of the text specified by the link definition. The Internet address of the image is specified in the OUT record.

The LNK record can be used to combine the above two examples so the author can define an image to be inlined and another URL to be linked to when the image is clicked on.

Example 3:
CSELECT 53 19 LNK <IMAGE> <INTERNET> </bookmgr/ibmlogo.gif> <http://www.ibm.com/> <> <LNK003>
Sample Text for LNK record to inline an image and link to another URL.

Non-Html Records For Link Destinations
The Search record:
The link reference record, known as SR record, is the only search record needed to handle hypertext link destination identifiers. The format of the SR record follows:

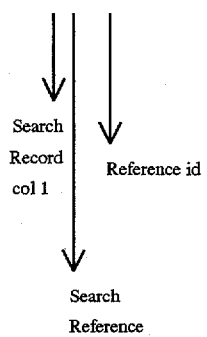

The search link reference records are used to establish reference points, the destination identifiers. These are specific locations (spots) in a book which may be accessed from arbitrary locations in the book and from other book files. The type of link reference records used for hypertext linking is:

Explicit: The explicit link reference records provide for unique identification of reference points. The explicit SR record identifier is typically contained on a CSELECT record elsewhere in the book. The identifier consists of a three character <type> specification followed by an <id> value, providing unique identifiers for an entire Book document.

The format of the explicit link SR record is "SR<type><id>", with no embedded blanks, where:
* The <type> values are three characters:

HDR topic header reference
BOO book reference
FIG figure reference
TBL table reference
QUE question reference
ANS answer reference
STP step reference
CMP compare reference
LIS list reference
SPT spot reference
FTN foot note reference
PIC picture reference

* The <id> value is the unique identifier for the reference, normally taken from the 'id=' attribute of the BookMaster tag.

Link reference functions used by DITA

The Scm_reflink function provides for finding the location (spot) in a book file referenced by a link from some other point. The location referenced is marked in the interchange file by a link reference (SR) record type, indicating this as the target (destination) of a link.

The link may originate in either the current book or in some other book file. The book file must be opened for searching and it must be the active book before invoking the link reference function.

The Scm_reflink function is used to set position at the unique SR record for that reference.

For example,

Scm_reflink(SRLINKID);

Scm_reflink sets position to the point in the book referenced by an explicit link. SRLINKID is the string from the referencing CSELECT record:

(i.e. CSELECT 15 6 FIGGETSMART)

Use Of HTML Anchors In The WWW Environment

The IBM server product is a stateless "machine" for displaying electronic text prepared using IBM's BookManager (TM) product. That is, nothing is retained or saved from one transaction to another. Since variable state data does not persist between requests, everything must be self contained within the translated document.

In order to make the non-HTML BookManager-produced links portable to the WWW, HTML markups in the form of anchor tags are generated and strategically inserted by the DITA process into the text. These anchors and head references may be in the same topic, another topic or another book. This information must be assembled for every hypertext link found within a given topic. HTML anchor tags are inserted for both link definitions and link destinations.

Sample Data:

Scenario: A reader is reading a topic (for example, 3.0) in a BookManager (TM) non-HTML formatted book, and encounters a hypertext reference to a figure (for example, FIGGETSMART). When the reader clicks on the hypertext link, they will be taken to the topic (1.2) containing the figure and will be scrolled to the identifier, figure (FIGGETSMART), within the topic.

The explanation of what happens is broken down into two phases, A and B, below:

A) Defining the link to be formatted in the topic to be dispplayed (topic 3.0)

B) Acting on the link (in topic 3.0) to be taken to the target destination (topic 1.2)

A) Defining the link:

When formatting the topic that contains the link definition (3.0), the non-HTML control record for the figure link encountered is:

CSELECT 7 32 FIGGETSMART

The DITA agent calls Scm_reflink to find (and verify) the current position of the FIGGETSMART identifier in the book. The agent extracts the topic ID (1.2) for the FIGGETSMART identifier. This is needed to construct the destination URL address and the converted HTML anchor definition tag.

The HTML generated text created for the link definition is:

See <A HREF="1.2#FIGGETSMART" > FIG. 11 in Getting Started 101</A> for more information.

In this example the control record is intercepted by the invention, the link reference (FIGGETSMART) is located in the book and its topic ID (1.2) is derived. An HTML anchor tag is constructed and inserted into the text at offset 7 for the length of 32, making the text "FIG. 11 in Getting Started 101" selectable (hot) text. The URL "1.2#FIGGETSMART" is the destination address of the link and the identifier of the location within the destination target to which to scroll when the link is taken, as found by the Scm_reflink link reference function. The topic (3.0) is presented to the reader for reading, with the proper HTML markup.

Acting on the link:

When the text "FIG. 11 in Getting Started 101" is selected by the reader (topic 3.0), DITA is invoked and told to position the book topic file being accessed to the link destination (topic 1.2). Non-HTML to HTML translation would begin for the destination topic (1.2) and the above process (phase A) is performed to format into HTML the new topic (1.2). Since this topic contains a link destination identifier (FIGGETSMART), as defined by the non-HTML search reference record: SRFIGGETSMART the HTML tag:

<A NAME="FIGGETSMART"> FIG. 11</a> is inserted in the topic (1.2) at the location of the identifier.

When the topic (1.2) is displayed, the portion of the document accessed will be set to the section that has the corresponding target identifier of FIGGETSMART, as designated by the HTML anchor tag in the target topic (topic 1.2), <A NAME="FIGGETSMART"> FIG. 11 </a>, because it appeared on the original link definition tag in topic 3.0:

<A HREF="1.2#FIGGETSMART">

DITA Detailed Processing Flow

The following details the flow through the DITA component to define and act on a hypertext link. Using the same scenario described above, a detailed processing flow description of DITA follows.

Scenario: A reader is reading a topic (3.0) in a non-HTML book and encounters a hypertext reference to a figure (FIGGETSMART). When the reader clicks on the hypertext link, they will be taken to the topic 1.2 containing the figure and will be scrolled to the figure (FIGGETSMART) within the topic.

Assumptions: The reader is reading topic 3.0 and the hypertext link destination for the figure exists in topic 1.2. The figure identifier is FIGGETSMART.

The explanation of what happens is broken down into two phases:

A) Defining the link to be formatted in topic 3.0

B) Acting on the link to be taken from topic 3.0 to the target destination, figure FIGGETSMART in topic: 1.2

A) Defining The Link In Topic 3.0:

When formatting topic 3.0 that contains the link definition, the non-HTML control record and the referenced text identified by the control record for the figure link encountered is:

CSELECT 7 32 FIGGETSMART

See FIG. 11 in Getting Started 101 for more information.

and the resulting HTML link tag and text to be generated is:

See <A HREF="1.2#FIGGETSMART"> FIG. 11 in Getting Started 101</A> for more information.

Beginning with FIG. 4, step A of defining the link to be formatted will be described.

Figure 4:
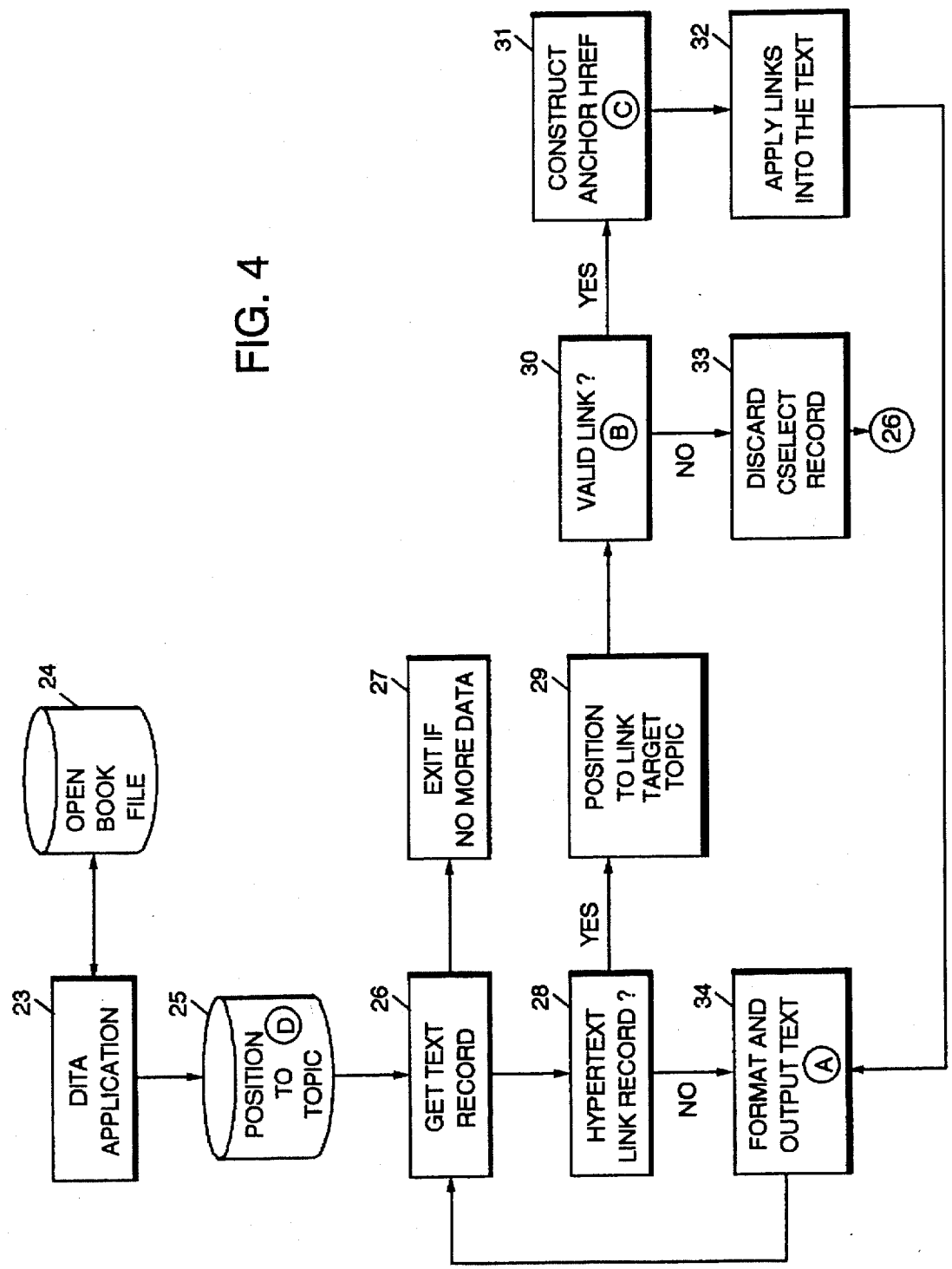
FIG. 4 illustrates schematically the dynamic interchange translation process flow of the preferred embodiment of the invention.

DITA is invoked, in box-23, FIG. 4, by the CGI program (FIG. 3, box-20).

DITA opens the book file, in box-24, to read the book.

The book is positioned to the requested topic in box-25, in this case, topic 3.0.

Text records are read, one by one in box-26, until no more records exist. If no more records exist, exit in box-27.

The text record is examined to see if it is a hypertext link record in box-28. The record: "CSELECT 7 32 FIGGETSMART" in this example, is a hypertext link record.

The destination topic (1.2) is accessed in box-29 when the record type in box-28 is a hypertext link record.

Figure 6A:
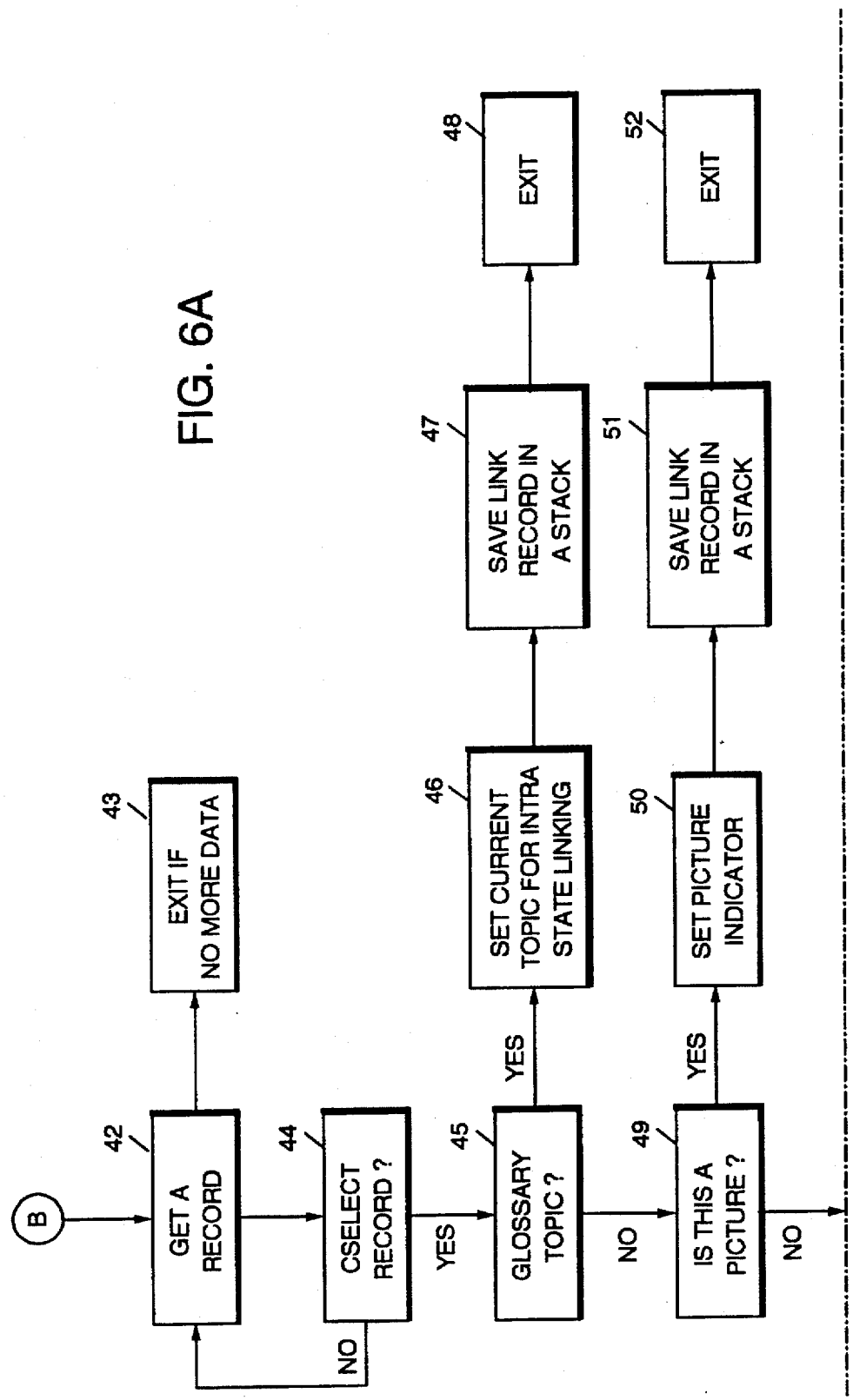

Next the defined link is validated in box-30, which entails a process shown in FIG. 6.

In FIG. 6, the link is validated as follows:

Get a record in box-42 and exit if no more records exist in box-43.

Check if record is a SELECT type control record (i.e. CSELECT) in box-44. If it is not a SELECT type record, get the next record in box-42 and check to see if it is a SELECT type control record.

If the record is a SELECT type,

Check to see if this is a glossary record in box-45. If it is a glossary record, then set the topic for intra linking in box-46, save the link record in the stack box-47 and exit in box-48.

If the record is not a glossary record,

Check to see if this is a picture record in box-49. If it is a picture record, then set picture indicator in box-50, save the link record in the stack, box-51 and exit, box-52.

Look up the current topic number in box-53. In this case, it will be "3.0".

Position the reader (currently displayed portion of book) to the target topic in box 54. In this case, the target topic is topic "1.2".

Check to see if the current topic is the same as the topic containing the target link in box 55. In this case, the current topic "3.0" is not the same as the target topic "1.2".

Add the target topic number "1.2" to the HREF tag in box-56.

Next, set the current topic for intra state (i.e., current topic is the target link) linking, box-57.

Save the link record in the stack, box-58. And, finally,

Get the next record, box-42.

If the link is not valid, meaning that the target of the link is not present, discard the CSELECT record in box-33 and get another text record, box-26.

Figure 7A:
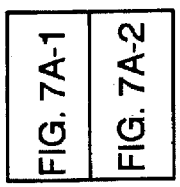
Figure 1:
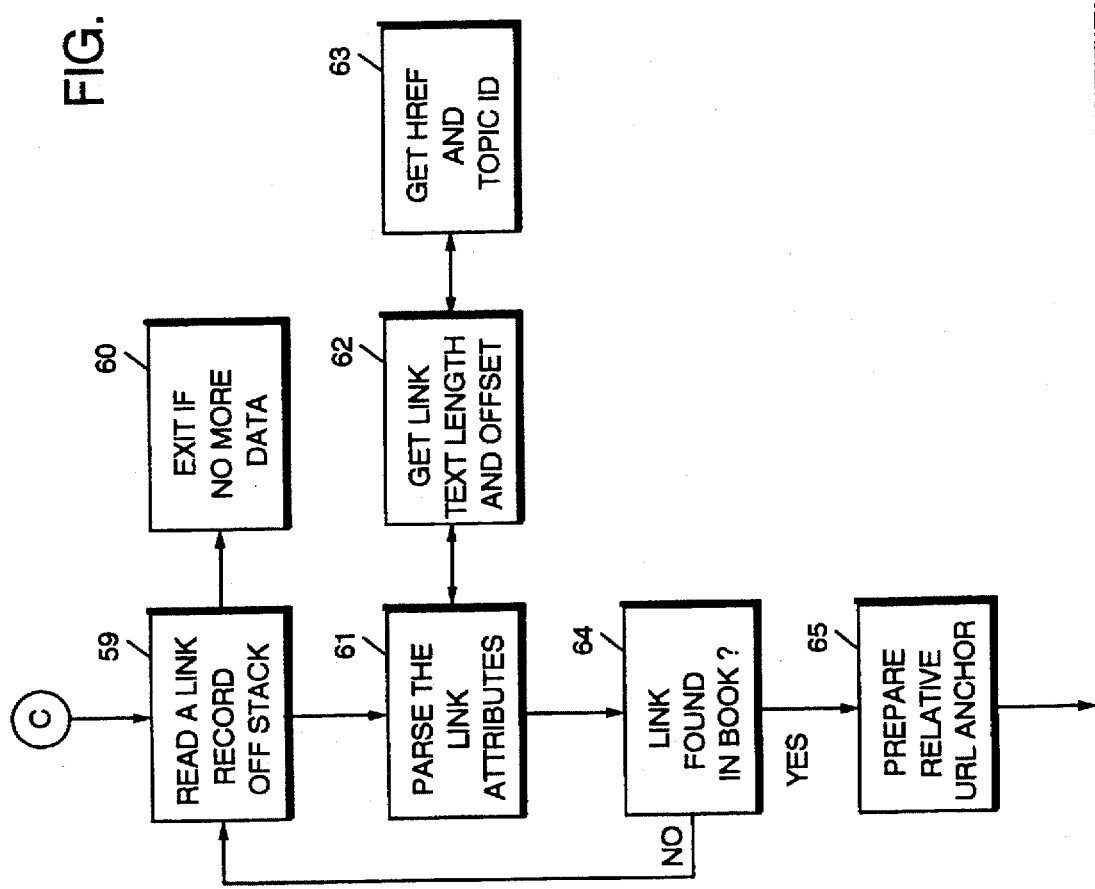
Figures 2, 7A:
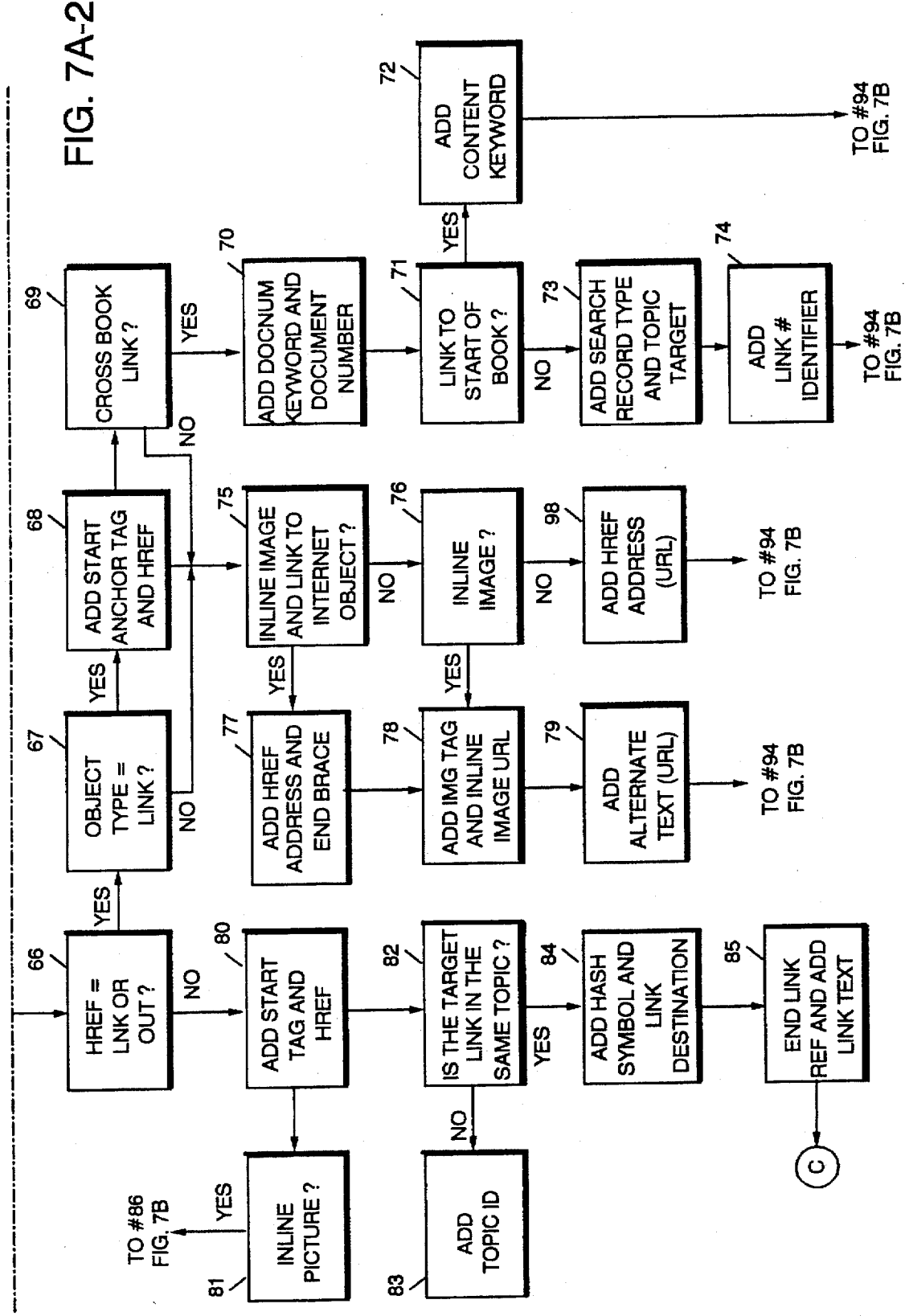

If the link is valid, construct the HTML Anchor HREF tag in box-31. This entails a lengthy process described in FIG. 7A. In FIG. 7A, the anchor tag is constructed as follows:

Read a link record from the stack, box-59 and exit if no more records exist, box-60.

Parse the link attributes, box-61.

Get the link text length and offset, box-62. In this case, the length and offset are "7" and "32", respectively. This is derived from the example "CSELECT 7 32 FIGGETS-MART" record.

Get the HREF and topic-id, box-63 via the Scm_reflink function.

Check to see if the link was found in the book, box-64. If not found in the book, go to box-59 to get a new link record.

if the link is found in the book, prepare the relative URL anchor, box-65.

See if the HREF is a LNK or OUT type control record box-66. (See explanation at end of scenarios for LNK/OUT flows)

Add the start tag and HREF tag box-80: (i.e. <a href=")

Check to see if this is an inline picture link box-81. If it is, go to FIG. 7B, box-86. (See explanation at end of scenarios for inline picture handling.) In this case, this is not an inline picture link.

Check to see if the target link is in the same topic, box-82. In this case, the target link "1.2" is not in the same topic.

Add the topic-id to the anchor tag, box-83:
(i.e. <a href="1.2)

Add the hash symbol and link destination identifier to the anchor tag, box-84:
(i.e. <a href="1.2#FIGGETSMART)

Add the end of link reference and add the link text, box-85:
(i.e. <a href="1.2#FIGGETSMART"> FIG. in Getting Started 101</A>), and finally, Go to box-59 to get a new link record.

Returning to FIG. 4, insert the constructed HTML links into the text, box-32.

Figure 5:
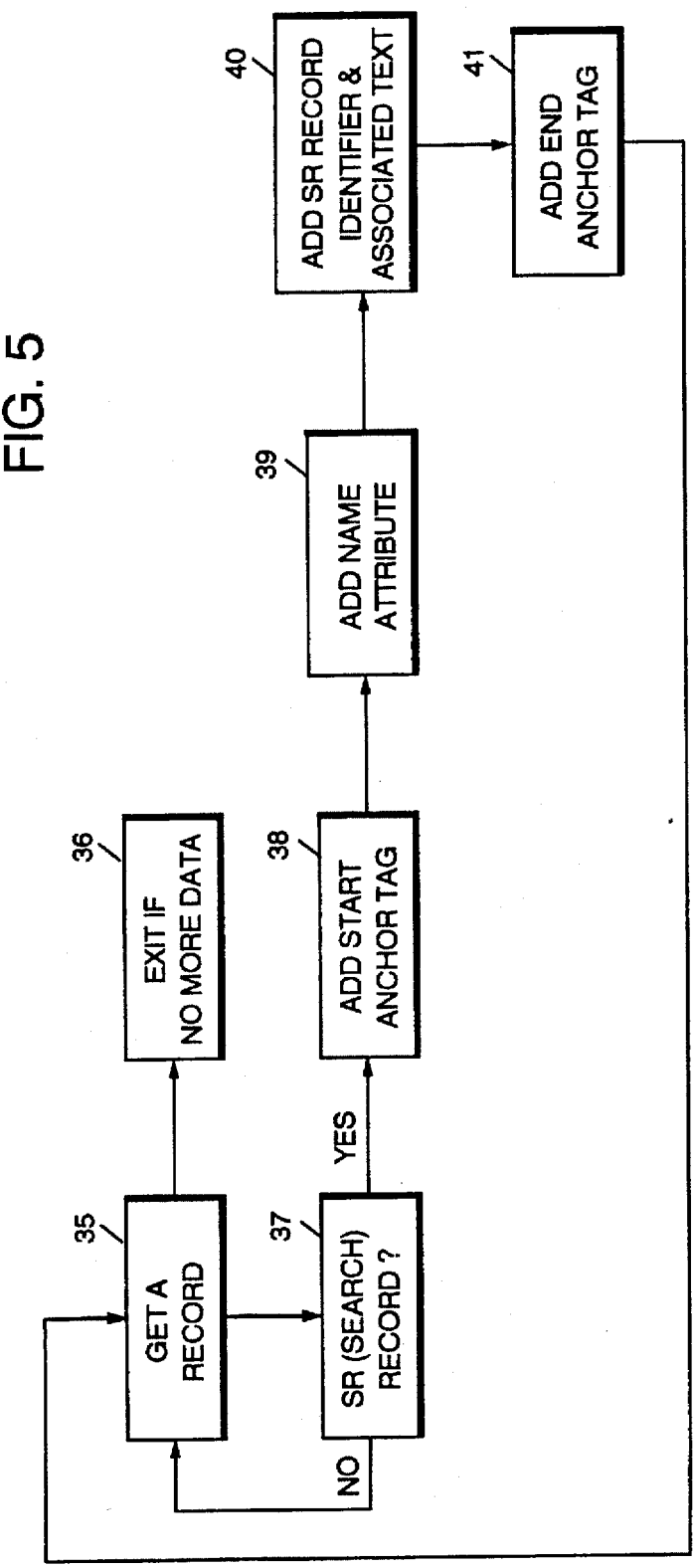
FIG. 5 illustrates schematically the operation of the preferred embodiment in constructing converted target link destination link anchor tags in HTML.

Format and output the text, box-34: This entails a process shown in FIG. 5. In FIG. 5, the target link destination markup is prepared as follows:

Get a record, box-35, and exit if no more records exist box-36.

See if the record is a SR (Search) record box-37. In this case, when formatting topic 3.0, the record is not an SR record. (See the detail walkthru of FIG. 5 under (B), Acting on the link taken from topic 3.0.)

Get the next text record, box-35, and exit if no more records.

Get the next text record, FIG. 4, box-26. Exit when no more records exist box-27.

Before moving on to the explanation of acting on the link, phase B, the explanation of the paths not taken in this specific scenario, but which are available options, follow:

AA) Scenarios for LNK and OUT forms of the CSELECT record flows:

Continuing with FIG. 7A, the LNK and OUT CSELECT handling is processed as follows. The scenarios come from the examples shown in section "Sample LNK and OUT forms of the CSELECT record with accompanying TEXT record".

Example 1:

To build a link to an internet object, the following steps are performed. The HTML link we are building looks like:
<a href="http://www.ibm.com"> Hot Text</a>
and is derived from the SELECT control and text records:
CSELECT 3 8 LNK <OTHER> <INTERNET> <> <http://www.ibm.com> <> <LNK001>
Hot Text Check to see if the OBJECT Type is a LNK record, box-67.

If so, add the start anchor tag and href, box-68 (i.e. <a href=")

Check to see if this is a cross-book link, box-69

In this example, we are not doing a cross-book link. However, for a cross-book link, the following steps would occur.

Assume we are creating the following HTML:
<a href="../../DOCNUM/XB02-0000/TBLTAB1#TBLTAB1" >here</a> from the following CSELECT record and Text record:
CSELECT 21 4 LNK <TBL> <TAB1> <> <XB02-0000> <> <XB2> 4. Link to tab1 here.

Add the docnum keyword and document number, box-70
(i.e. <a href="../../DOCNUM/XB02-0000)

Check to see if link is to beginning of book only, box-71. If so, add the CONTENTS keyword, box-72 and Go to box-94. In this example, it is not a link to the beginning only.

Add the Search record identifier type and target, box-73. (i.e. <a ref="../../DOCNUM/XB02-0000/TBLTAB1)

Add the link identifier with the hash sign, box-74 (i.e. <a href="../../DOCNUM/XB02-0000/TBLTAB1#TBLTAB1 )

Go to box-94 to complete the tagging.

Check to see if this is a combined inline image and link to Internet, box-75. This is described in example 3 below.

Check to see if this is an inline image only, box-76. This is described in example 2 below.

Add the URL address to the HREF keyword, box-98 (i.e. <a href="http://www.ibm.com)

Add the ending quote and ending brace box-94 (i.e. <a href="http://www.ibm.com" >)

Add the associated text from the text record, box-95 (i.e. <a href="http://www.ibm.com" > Hot Text)

Add the ending anchor tag, box-96 (i.e. <a href="http://www.ibm.com"> Hot Text</a>)

Add the converted text to the buffer, box-97

Go to box-59 to read a new record.

Example 2:

To inline an Internet image, the following steps are performed. The HTML link we are building looks like:
<img src="/bookmgr/library.gif"alt="/bookmgr/library.gif"> Sample text </a> and is derived from the SELECT control and text records:
CSELECT 3 11 OUT <IMAGE><INTERNET></bookmgr/library.gif>Sample text Put out IMG tag and the URL address of the inline image (box-78). (i.e. <img src="/bookmgr/library.gif")

Add the alternate text tag and URL address, box-79 (i.e. <img src="/bookmgr/library.gif" alt="/bookmgr/library.gif)

Go to box-94 to complete the tagging.

Example 3:

To both inline an internet image and link the image to an internet object, the following steps are performed. The HTML link we are building looks like:
<a href="http://www.ibm.com"> <img src="/bookmgr/ibmlogo.gif" alt="/bookmgr/ibmlogo.gif">Hot Text</a> and is derived from the SELECT control and text records:
CSELECT 3 8 LNK <IMAGE> <INTERNET> </bookmgr/ibmlogo.gif> <http://www.> <> <LNK003>
Hot Text Add HREF address (URL) and ending brace, box-77 (i.e. <a href="http://www.ibm.com" >)

Put out IMG tag and the URL address of the inline image, box-78. (i.e ... <img src="/bookmgr/ibmlogo.gif")

Add the alternate text tag and URL address, box-79 (i.e ... <img src="/bookmgr/ibmlogo.gif"alt="/bookmgr/ibmlogo.gif)

Go to box-94 to complete the tagging.

AB) Scenarios for non-HTML inline picture handling The HTML we are building looks like:
<a href="picture-1?mode=zoom"> <img src="picture-1?mode=img" alt="PICTURE 1" ></a> and is derived from the SELECT control and text records:
CSELECT 3 9 PIC1
PICTURE 1

Figure 7B:
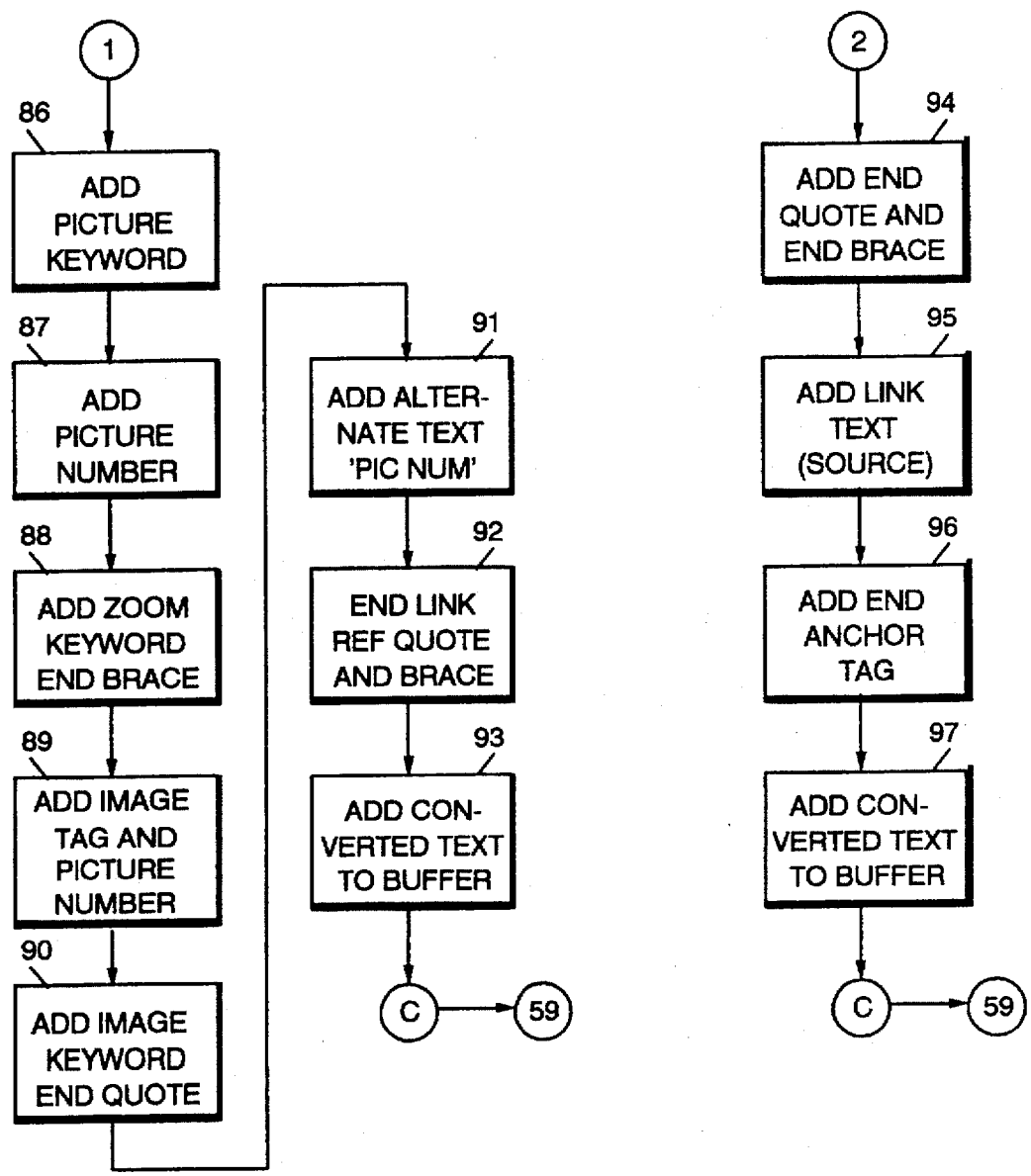
FIG. 7B illustrates schematically the operation of the preferred embodiment in converting non-HTML picture references and links to other documents outside of the specific document being accessed.

Turning to FIG. 7B, inline picture handling is processed as follows:

Add the PICTURE keyword to the URL, box-86 (i.e. <a href="picture)

Add the picture number to the URL, box-87 (i.e. <a href="picture-1)

Add the Zoom keyword and ending brace to the URL, box-88 (i.e. <a href="picture-1?mode=zoom">

Add the image tag with the picture number as the URL and the non-zoomed mode keyword, box-89 (i.e. ... <img src="picture-1?mode=img)

Add the image keyword ending quote, box-90 (i.e. ... <img src="picture-1?mode=img")

Add the alternate text, box-91, using the picture number (i.e. ... <img src="picture-1?mode=img"alt="PICTURE 1)

Add the ending link quote and brace, box-92 (i.e. ... <img src="picture-1?mode=img"alt="PICTURE 1"></a>)

Add the HTML converted text to the buffer, box-93

Go to box-59, FIG. 7A, for a new record.

B) Acting On The Link Taken From Topic 3.0 When the text "FIG. 11 in Getting Started 101" is selected by the reader in topic 3.0), DITA is invoked and told to access the portion of the book at the link destination, topic 1.2. When formatting topic 1.2, the destination identifier FIGGETSMART) denoted by the Search Reference and Text record:

SRFIGGETSMART

FIG. 11 is formatted into the resulting HTML link destination tag:

<A NAME="FIGGETSMART">FIG. 11 </a> and inserted in topic 1.2 at the location of the reference identifier, in this case FIG. 11.

Returning to FIG. 4,

DITA opens the book file, box-24 to read the book.

The book text to be displayed is positioned to the requested topic, box-25, in this case, to topic 1.2.

Text records are read one by one, box-26, until no more records exist. If no more records exist, exit, box-27.

The text record is examined to see if it is a hypertext link record, box-28. In this case, it is Search Reference record "SRFIGGETSMART".

Format and output the text for display, box-34:

Beginning with FIG. 5, the target link destination markup is prepared as follows:

Get a record (box-35) and exit if no more records exist, box-36.

See if the record is a SR (Search Reference) record, box-37. In this case, when formatting topic 1.2, the record is an SR record.

When acting on a SR record, we add the start anchor tag, box-38 to form the needed HTML hypertext link. (i.e. <A)

Add the name attribute to the HTML tag, box-39 (i.e. <A NAME=")

Next, the identifier is added to the name attribute from the SR record and the associated text, box-40 (i.e. <A NAME="FIGGETSMART"> FIG. 11)

Last, the end anchor tag is added, box-41, to complete the HTML tag (i.e. <A NAME="FIGGETSMART"> FIGS. 11 </a>)

Go to box-35 for another record or to exit, box-36. In this case, we will exit.

Go to box-26 to get another text record or exit, box-27. In this case, we continue to format the remaining text in topic 1.2 and then exit.

In conclusion, the invention described solves the following problems:

1. NON-HTML inter and intra-book links are both verified and dynamically resolved to HTML format.
2. The books (or other documents) are used "as is" with no changes.
3. The author of the book does not have to learn HTML, write in HTML format, or manually update links when the book is changed.
4. The books remain portable.
5. Books and bookshelves can be searched rapidly.
6. Dynamic HTML conversion validates current link locations.

Having thus completely described our invention in detail with regard to a preferred embodiment thereof, it will be apparent to those of skill in this art that the processes of the invention are not limited to the BookManager non-HTML format conversion to HTML format, but are equally applicable to any non-HTML hypertext electronic documents to be accessed over WWW. Therefore, what is desired to be protected by letters patent is set forth in the appended claims by way of description and not as limitation, wherefore what is claimed is:

1. A method for converting input source file materials containing non-HTML formatted hypertext links to output file HTML formatted hypertext links, comprising steps in a computer having a processor, memory, input/output and communication interfaces for:

accessing a user requested topic segment in said input source file material;

identifying any hypertext links included in said topic segment;

verifying that any referenced material contained in each said hypertext link exists;

recording the location in the referenced work where said referenced material may be found;

constructing HTML formatted anchor reference tags for each said verified hypertext link; and formatting an output file that includes said HTML formatted anchor reference tags in place of any said hypertext links included in said accessed topic segment.

2. A method as described in claim 1, wherein:

said identifying of any hypertext links includes searching said user requested topic segment of said non-HTML formatted source file for any control records including the designation CSELECT; and analyzing any said control records found in said search to determine the hypertext link target location information therefrom.

3. A method as described in claim 1, wherein:

said step of constructing said HTML formatted anchor reference tags includes concatenating a formatted HTML hypertext link reference of the format <a HREF="url"> text <a >, wherein said "url" portion thereof corresponds to said hypertext link target location.

4. A method as described in any one of claims 1–3, further including steps for:

converting all non-HTML formatted text in said user requested topic segment of said source file to HTML formatted text.

5. A hypertext link converter for converting input source file materials containing non-HTML formatted hypertext links to output file HTML formatted hypertext links, comprising steps executable in a computer, and effective for:

accessing a user requested topic segment in said input source file material;

identifying any hypertext links included in said topic segment;

verifying that any referenced material contained in each hypertext link exists;

recording the location in a referenced work where said referenced material may be found;

constructing HTML formatted anchor reference tags for each said hypertext link identified in said topic segment; and formatting an output file text that includes said HTML formatted anchor reference tags in place of any said hypertext links included in said accessed topic segment.

6. A converter as described in claim 5, further including steps for:

searching said user requested topic segment of said non-HTML formatted source file for any control records including the designation CSELECT; and analyzing any said control records found in said search to determine the hypertext link target location information therein.

7. A converter as described in claim 6, wherein:

an executable step for concatenating a formatted HTML hypertext link reference of the format <a HREF="url"> text <a>, wherein said "url" portion thereof corresponds to said hypertext link target location.

8. A converter as described in any one of claims 5–7, further including executable steps effective for:

converting all non-HTML formatted text in said user requested topic segment of said source file to HTML formatted text.

* * * * *